No. 802,378. PATENTED OCT. 24, 1905.
L. J. ELLIS.
COOKING OR CULINARY VESSEL.
APPLICATION FILED JULY 6, 1904.
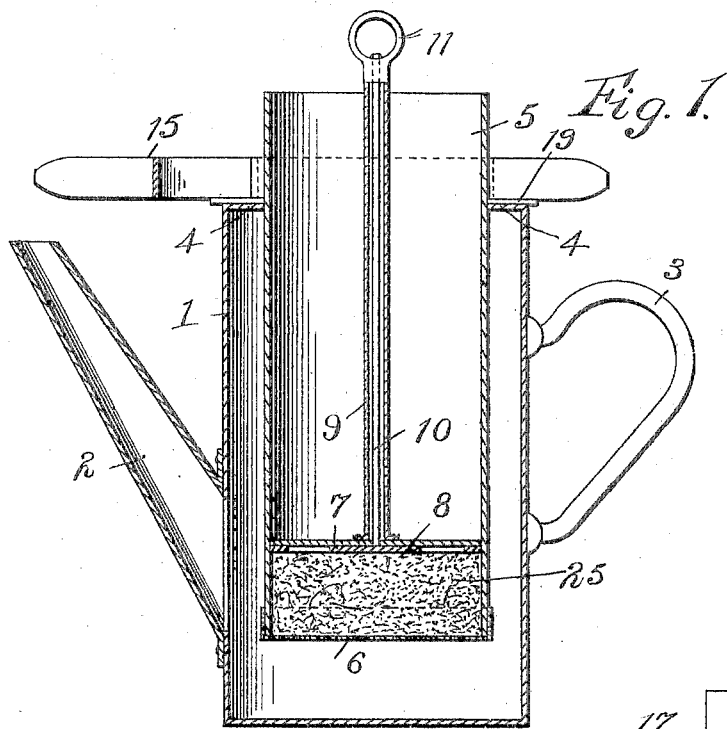
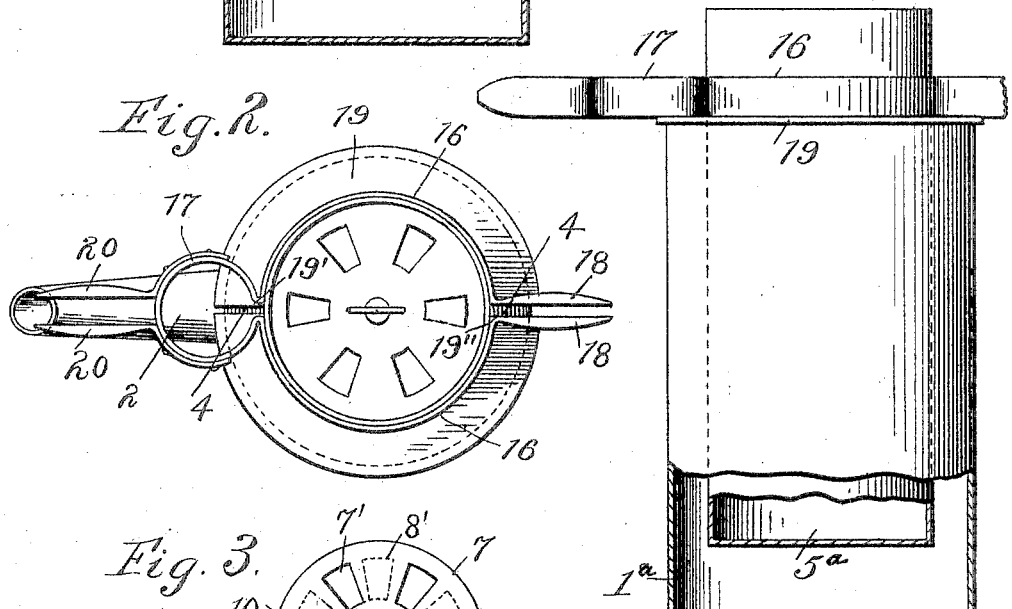

UNITED STATES PATENT OFFICE.

LEROY J. ELLIS, OF FANWOOD, NEW JERSEY.

COOKING OR CULINARY VESSEL.

No. 802,378.     Specification of Letters Patent.     Patented Oct. 24, 1905.

Application filed July 6, 1904. Serial No. 215,553.

*To all whom it may concern:*

Be it known that I, LEROY J. ELLIS, a citizen of the United States, residing at Fanwood, in the county of Union and State of New Jersey, have invented certain new and useful Improvements in Cooking or Culinary Vessels, of which the following is a specification.

This invention relates to improvements in cooking or culinary utensils, and has for its object the construction of a device of this character which consists, essentially, of a receptacle, a vessel contained within said receptacle, and means engaging the vessel to hold it in adjustable relation with the receptacle.

Another object of this invention is to arrange within the vessel means which will allow said vessel to be employed as a measure to determine the quantity of water that it is desired to use. This is accomplished by having perforated disks or plates within the vessel in such manner that the perforations in said disks can be moved to a position so that they will not register, thereby forming a false bottom for retaining water within said vessel. Means are provided for controlling the disks from without the vessel, whereby the perforations can be made to register and the water allowed to flow from the vessel into the receptacle.

With these ends in view I have devised and constructed the hereinafter-described invention, which will first be explained as to detail and then specifically pointed out in the annexed claims.

In the accompanying drawings, Figure 1 is a central vertical section of my improved vessel. Fig. 2 is a plan view of the same. Fig. 3 is a detail plan view of the water-controlling disks. Fig. 4 shows the spring-clamp applied to another form of cooking vessel.

When it is desired to utilize the vessel as a coffee-pot, the construction shown in Fig. 1 is preferred, and in which 1 is the receptacle, having attached thereto a spout 2 and a handle 3. (The spout 2 may be omitted from the receptacle when it is designed for other cooking purposes.) The upper part of the receptacle 1 has inturned flanges 4, which act as guides to centralize the position of the vessel 5. The vessel 5, as shown in Fig. 1, is preferably of cylindrical shape and is of sufficiently less diameter to permit a free circulation of water therearound. The lower end of the vessel 5 is covered with gauze or wire-netting 6, so that when the water is poured into said vessel it will run through into the receptacle.

Contained within the vessel 5, near the bottom thereof, are disks 7 and 8. These disks fit against the inner walls of the vessel 5, but not with sufficient friction to bind them, but so that they can be readily removed therefrom when desired. These disks have openings 7' and 8' therein, said openings being so arranged in the disks that they will register when the disks are turned and one opening brought directly above the other. The disks are held in contact with each other and are controlled from without the vessel, the upper disk by means of a tube 9, which is secured thereto, said tube extending upwardly through the vessel 5, as shown in Fig. 1. The lower disk is controlled by a rod 10, to which it is attached, said rod extending upwardly through the tube 9, and at the top of the tube 9 is a ring or handle 11, by means of which the said disk 7 may be rotated to make the holes 7' and 8' in the two disks register when it is desired to allow the water to flow from the vessel 5 into the receptacle 1.

In order to retain the vessel in any desired position within the receptacle—that is, with relation to vertical adjustment—a spring-clamp 15 is provided. This clamp 15 is preferably constructed of any suitable spring metal and consists of a main portion 16, which surrounds and embraces the vessel 5, and a spring portion 17, circular in form and which acts to hold the main portion normally clamped against the vessel 5. The free ends of the spring-clamp are shaped to form handles, as shown at 18, and by means of which the vessel can be readily removed from the receptacle when it is so desired. When it is desired to change or readjust the position of the vessel within the receptacle, the spring-clamp 15 is disengaged from the vessel 5 by applying pressure to the handles 20, said handles being attached to the circular spring portion 17 of the spring-clamp.

The spring-clamp 15 has attached to the bottom of the main portion 16 thereof and extending out in a horizontal manner a flange 19, said flange being split at 19' and 19", as shown in Fig. 2, in order to allow free movement of the spring-clamp. This flange is intended to rest on the top of the receptacle 1 and when the said outer vessel does not have the inturned flange portion 4 will act as a cover for the said receptacle.

The vessel is operated in the following manner: Presuming, as shown in Fig. 1, that the vessel is to be employed in the making of coffee, the vessel 5 having been removed from the receptacle and the disks 7 and 8 having been removed from the vessel, the coffee is placed within the vessel, where it rests on the gauze or wire-netting 6, as shown at 25 in Fig. 1. The disks 7 and 8 are then moved with relation to each other, so that the openings therein do not register, and placed within the vessel 5 until they rest on the coffee. The spring-clamp 15 is then adjusted on the vessel 5 in the desired position—that is, so that the vessel 5 will be the desired distance from the bottom of the receptacle 1. In the manner hereinbefore stated the water is then poured in the vessel 5, the disks 7 and 8 preventing the water from passing into the receptacle and the said vessel 5 acting as a measure to determine the quantity of water that it is desired to use. After the water has been properly measured the ring 11 of rod 10 is turned until the openings 7' and 8' in the disks 7 and 8 register, whereupon the water will flow through said disks and through the coffee into the receptacle 1, where when the said receptacle 1 is placed upon a stove the coffee will be boiled in the usual manner, or it may be prepared in the usual way for "drip-coffee."

In Fig. 4 a modified form is shown wherein the receptacle 1ª has its bottom removed and the vessel 5ª with an imperforate bottom to receive the food to be cooked is placed within said receptacle, said vessel being held in any desired position within said receptacle by means of the spring-clamp 16 in the same manner as shown in Fig. 1.

Having thus described my invention, the following is what I claim as new therein and desire to secure by Letters Patent:

1. In a cooking utensil, the combination of a receptacle, a vessel contained within said receptacle, and a spring-clamp for adjustably engaging said vessel and provided with carrying-handles and also with handles adapted to release the clamp from engagement with the vessel.

2. In a cooking utensil, the combination of a receptacle, a vessel contained within said receptacle and a clamp adjustably engaging the vessel and provided with a spring portion which tends to hold the clamp in engagement with said vessel, and handles attached to said spring portion for releasing the clamp from engagement with said vessel.

3. In a cooking utensil, the combination of a receptacle, a vessel contained within said receptacle, a spring-clamp adjustably engaging the said vessel, handles for releasing the spring-clamp, and a horizontal flange adapted to rest on the receptacle, for the purpose explained.

4. In a cooking utensil, the combination of a receptacle provided with an inturned flange at its opening, a vessel engaged by the inturned flange to centralize it within the receptacle, a spring-clamp normally engaging the vessel and adjustably retaining said vessel within the receptacle and also provided with a horizontal flange adapted to rest on the top of the receptacle, for the purpose explained.

5. In a cooking utensil, the combination of a receptacle, a vessel contained within said receptacle, plates fitting within said vessel and provided with openings capable of registering with each other, and means for controlling said plates operatable without the vessel, for the purpose explained.

6. In a cooking utensil, the combination of a receptacle, a vessel contained within said receptacle, plates fitting within said vessel, and provided with openings capable of registering with each other, a tube attached to one of the plates and extending without the vessel and a rod attached to the other plate and extending through the said tube without the vessel, for the purpose explained.

LEROY J. ELLIS.

Witnesses:
WILLIAM P. HAMMOND,
ELLEN HOUGH.